United States Patent
Tamir et al.

(10) Patent No.: US 11,531,903 B2
(45) Date of Patent: Dec. 20, 2022

(54) REAL DRIFT DETECTOR ON PARTIAL LABELED DATA IN DATA STREAMS

(71) Applicant: Actimize LTD., Ra'anana (IL)

(72) Inventors: Ganir Tamir, Kfar Saba (IL); Danny Butvinik, Haifa (IL); Yoav Avneon, Ness-Zyiona (IL)

(73) Assignee: ACTIMIZE LTD, Ra'anana (IL)

( * ) Notice: Subject to any disclaimer, the term of this patent is extended or adjusted under 35 U.S.C. 154(b) by 349 days.

(21) Appl. No.: 16/945,876

(22) Filed: Aug. 2, 2020

(65) Prior Publication Data
US 2022/0036201 A1 Feb. 3, 2022

(51) Int. Cl.
*G06N 5/00* (2006.01)
*G06K 9/62* (2022.01)
*G06N 20/10* (2019.01)

(52) U.S. Cl.
CPC ........... *G06N 5/003* (2013.01); *G06K 9/6256* (2013.01); *G06K 9/6298* (2013.01); *G06N 20/10* (2019.01)

(58) Field of Classification Search
CPC ............ G06N 5/00; G06N 5/02; G06N 5/025; G06N 5/027; G06N 5/003; G06N 5/04; G06N 20/00; G06N 20/10; G06N 20/20; G06K 9/6256; G06K 9/6298
See application file for complete search history.

(56) References Cited

U.S. PATENT DOCUMENTS

| | | | |
|---|---|---|---|
| 2018/0075362 A1* | 3/2018 | Moreira-Matias | G06N 7/005 |
| 2020/0012900 A1* | 1/2020 | Walters | G06F 9/547 |
| 2021/0182600 A1* | 6/2021 | Yu | G06K 9/628 |

OTHER PUBLICATIONS

Yen-Chi Chen. "Lecture 6: Density Estimation: Histogram and Kernel Density Estimator", STAT 425: Introduction to Nonparametric Statistics, 2018.
Geoffrey I. Webb et al., "Characterizing Concept Drift", arXiv:1511. 03816v6 [cs.LG] Apr. 8, 2016.
Alexey Tsymbal, "The problem of concept drift: definitions and related work", Department of Computer Science, Trinity College Dublin, Ireland, Apr. 29, 2004.
(Continued)

*Primary Examiner* — Shane D Woolwine
(74) *Attorney, Agent, or Firm* — Soroker Agmon Nordman

(57) ABSTRACT

A computerized-method for real-time detection of real concept drift in predictive machine learning models, by processing high-speed streaming data. The computerized-method includes: receiving a real-time data stream having labeled and unlabeled instances. Obtaining a window of 'n' instances having a portion of the 'n' instances as reliable labels. Computing posterior distribution of the reliable labels; and operating a Drift-Detection (DD) module. The DD module is configured to: operate a kernel density estimation on the computed posterior distribution for sensitivity control of the DD module; operate an error rate function on the estimated kernel density to yield an error value; and train an incremental estimator module, according to the kernel density estimation. When the error value is not above a preconfigured drift threshold repeating operations (i) through (iii), else when the error value is above the preconfigured drift threshold, at least one concept drift related action takes place.

12 Claims, 13 Drawing Sheets

(56) References Cited

OTHER PUBLICATIONS

Veena Mittal et al., "Online Methods of Learning in Occurrence of Concept Drift", International Journal of Computer Applications (0975-8887), vol. 117—No. 13, May 2015.

Heng Wang et al., "Concept Drift Detection for Streaming Data", arXiv:1504.01044v2 [stat.ML] May 3, 2015.

Albert Bifet, "Classifier Concept Drift Detection and the Illusion of Progress", May 17.

Stanislaw Węlarczyk, "Kernel density estimation and its application", Cracow University of Technology, Institute of Water Management and Water Engineering,I TM Web of Conferences 23, 00037 (2018), XLVIII Seminar of Applied Mathematics, https://doi.org/10.1051/itmconf/20182300037.

Ali Pesaranghader, "McDiarmid Drift Detection Methods for Evolving Data Streams", realarXiv: 1710.02030v1 [stat.ML] Oct. 5, 2017.

Qi Li & Jeffrey Scott Racine, 2006. "Density Estimation, from Nonparametric Econometrics: Theory and Practice," Introductory Chapters, in: Nonparametric Econometrics: Theory and Practice, Chapter 1—Density Estimation. Princeton University Press.

Lynch, Scott M. Introduction to applied Bayesian statistics and estimation for social scientists—Chapter 3 "Basics of Bayesian Statistics". Springer Science & Business Media, 2007.

Statistics 200: Introduction to Statistical Inference—Lecture 20—Bayesian analysis, Zhou Fan, Stanford University, Autumn 2016.

\* cited by examiner

| Dataset Name | Num of Instances | Num of Classes | Num of Attributes |
|---|---|---|---|
| HyperPlane | 100,000 | 2 | 10 |
| SEA | 100,000 | 2 | 3 |

Figure 10A

| Datasets → | HyperPlane | | SEA | |
|---|---|---|---|---|
| (% label) Drift Detection Method | Avg Accuracy | Num of Drift | Avg Accuracy | Num of Drift |
| PH | 0.829 | 13 | 0.874 | 4 |
| ADW | 0.833 | 18 | 0.869 | 8 |
| EDDM | 0.777 | 8 | 0.871 | 8 |
| DDM | 0.754 | 5 | 0.869 | 2 |
| (1.0) DensityEst | 0.826 | 8 | 0.876 | 4 |
| (0.9) DensityEst | 0.828 | 6 | 0.874 | 4 |
| (0.8) DensityEst | 0.822 | 5 | 0.871 | 7 |
| (0.7) DensityEst | 0.822 | 8 | 0.865 | 6 |
| (0.6) DensityEst | 0.824 | 10 | 0.867 | 4 |
| (0.5) DensityEst | 0.825 | 11 | 0.867 | 4 |
| (0.4) DensityEst | 0.822 | 7 | 0.868 | 5 |
| (0.3) DensityEst | 0.828 | 9 | 0.861 | 7 |
| (0.2) DensityEst | 0.824 | 12 | 0.861 | 5 |

Figure 10B

REAL DRIFT DETECTOR ON PARTIAL LABELED DATA IN DATA STREAMS

TECHNICAL FIELD

The present disclosure relates to the field of machine learning in which data becomes available in a sequential order and is used to update the best predictor for future data at each step. More specifically, the present disclosure relates to the field of real concept drill detection in machine learning models, statistics and data science.

BACKGROUND

Call centers are increasingly becoming a target for fraudsters via their customer service channels. Call center frauds are one of the leading threats that organizations such as financial institutions face. The fraudsters commonly attempt to retrieve information or change information of other legitimate customers by exploiting call center agents. For example, fraudsters may conduct an attack on a financial institution by manipulating the call center agents to provide them with confidential information of legitimate customers and then use the extracted information to commit another fraud such as identity theft.

Currently, to identify these fraudulent attempts and alert the end-users, there are machine learning models, which are operating according to one or more functions. These one or more functions predict the output, e.g., fraudulent attempt, according to the provided input, based on provided historical data. Meaning, it assumes that the one or more functions i.e., relationships are static i.e., do not change over time.

However, events in the real world are often dynamic and data changes over time. This can result in poor and degrading predictive performance of the predictive models that assume a static relationship between input and output parameters.

An example of dynamic relationship between input and output parameters may be the behavior of customers in an online shop which changes over time. When a predictive model is predicting the weekly merchandise sales it may use inputs such as the amount of money spent on advertising, promotions, and other metrics that may affect the weekly merchandise sales. However, the predictive model is likely to become less and less accurate over time due to a change in the underlying relationships in the data which is called concept drift. In the merchandise sales application, one reason for a concept drift may be a seasonal change in shopping behavior. Often there are higher sales in the winter holiday season than during the summertime. The seasonal changes in shopping behavior are called hidden context.

In another example, fraudulent activity may take many shapes and forms. It has attributes such as having the attack performed via multiple frequent attacks or attempts on a singular legitimate customer account or on multiple customer accounts. The attacks may be via different channels such as mobile application, call-center calls or internet on different lines of business e.g., VIP handling agents. Another type of attack is a "targeted attack" in which the attack is targeted to a specific individual i.e., customer. Yet, another type of attack is a "spread out attack" in which the attack is on various customers in the call center.

The predictive model may use inputs such as the channels of the attack, the "targeted attack" and the "spread out attack" to predict fraud. A concept drift in these predictive models may occur when the predictive models may not take into account a hidden context such as national pandemic which forced many agents of the financial institution to work remotely and exposed the financial institution to security breaches thus influencing the relationship between input and output parameters in the one or more functions of the predictive models.

Therefore, an increasing online deployment of machine learning models creates a need for a technical solution for development of efficient and effective mechanisms to address machine learning models in the context of non-stationary distributions, or as described above, concept drift. Current machine learning models do not take into account the key issue of characterizing the different types of concept drift that may occur.

Many real-world applications such as credit card fraud detection, rely heavily on data streams of information. In these machine learning applications, typically the relations between parameters and patterns in the data evolve over time which causes predictive learning models to become outdated. The challenge for predictive modeling in learning from real-world domain is that the concept of interest depends on some hidden context which are usually uncaptured in the form of predictive attributes. Often, the change of uncaptured hidden context in data attributes is the cause of concept drift which makes the learning task more complicated. As further described in "Characterizing Concept Drift", Webb, G. I., Lee, L. K., Goethals, B., & Petitjean, F. (2018). Analyzing concept and shift from sample data. Data Mining and Knowledge Discovery, 32(5), 1179-1199, hereby incorporated by reference.

Therefore, there is a need for a technical solution that will learn from streaming environment with limited data labels and detect real concept drift concurrently. That is, a model capable of automatically detecting concept drifts in the data-based Kernel Density Estimation (KDE) on partially labeled streaming data.

Predictive models may encounter two types of concept drift: real drift and virtual drift. Real drift is the change in posterior probabilities $p(y|X)$. Virtual drift is the change in distribution of X without affecting the posterior probabilities.

Many approaches on concept drift detection either assume full availability of data labels or handle only the virtual drift. However, full availability of data labels is not applicable as the process of labeling all the information might be expensive. Accordingly, there is a need for semi-supervised machine learning models that will learn and adapt well to data stream with low availability of labelled data and the presence of real concept drift and detect real concept drift under low availability of labelled data by directly monitoring the change in posterior probability distribution over time. As further described in "McDiarmid Drift Detection Methods for Evolving Data Streams,", A. Pesaranghader, H. L. Viktor and E. Paquet, 2018, International Joint Conference on Neural Networks (IJCNN), Rio de Janeiro, 2018, pp. 1-9, doi: 10.1109/IJCNN.2018.8489260, hereby incorporated by reference.

Accordingly, there is a need for a real concept drill detection method which will monitor the overlapping density areas of the posterior probabilities' distributions from at least one estimator and will utilize the densities of posterior probabilities in partially labeled streaming data environments.

SUMMARY

There is thus provided, in accordance with some embodiments of the present disclosure, a computerized-method for real-time detection of real concept drift in predictive machine learning models, by processing high-speed streaming data.

In accordance with some embodiments of the present disclosure, in a computerized-system. comprising a processor and a memory, the processor may receive a real-time data stream having labeled and unlabeled instances.

Furthermore, in accordance with some embodiments of the present disclosure, every preconfigured period of time, performing by the processor the following operations:
(i) obtaining a window of 'n' instances from the data stream having a portion of the instances as reliable labels;
(ii) computing posterior distribution of the reliable labels of the portion of the 'n' instances; and
(iii) operating a Drift-Detection (DD) module.

Furthermore, in accordance with some embodiments of the present disclosure, the DD module may be configured to: (i) operate a kernel density estimation on the computed posterior distribution for sensitivity control of the DD module; (ii) operate an error rate function on the estimated kernel density to yield an error value; and (iii) train an incremental estimator module, according to the kernel density estimation.

Furthermore, in accordance with some embodiments of the present disclosure, when the error value is not above a preconfigured drift threshold, the processor may repeat operations (i) through (iii). Else when the error value is Above the preconfigured drift threshold, at least one real concept drift related action may take place.

Furthermore, in accordance with some embodiments of the present disclosure, after obtaining a window of 'n' instances from the data stream, the processor may be further configured to: (i) count the labeled instances in the 'n' instances; and (ii) multiply a labeling cost by the counted labeled instances to yield a total-cost. When the total-cost is not above a preconfigured labeling budget: the processor may operate a Knowledge Discovery (KD) module to obtain the reliable labels of the portion of the 'n' instances, by applying one or more machine learning models; and perform operations (ii) through (iii).

Furthermore, in accordance with some embodiments of the present disclosure, before the performing of operations (ii) through (iii), the processor may initiate and train a static estimator, according to the obtained reliable labels to provide the DD module a posterior distribution.

Furthermore, in accordance with some embodiments of the present disclosure, the reliable labels of the portion of the 'n' instances may be provided by an end-user before the obtaining of a window of 'n' instances from the data stream.

Furthermore, in accordance with some embodiments of the present disclosure, when the error value is not above a predefined warning threshold, training the incremental estimator module with the obtained reliable labels of a portion of the 'n' instances.

Furthermore, in accordance with some embodiments of the present disclosure, the error rate function may be a Gauss error function.

Furthermore, in accordance with some embodiments of the present disclosure, the posterior distribution is a sum of a prior distribution and a result of a likelihood function.

Furthermore, in accordance with some embodiments of the present disclosure, the operating of the incremental estimator module may comprise operating an incremental decision tree learner and training the incremental estimator module, according to the kernel density estimation.

Furthermore, in accordance with some embodiments of the present disclosure, the incremental decision tree learner may be an Hoeffding tree.

Furthermore, in accordance with some embodiments of the present disclosure, the at least one real concept drift related action which takes place when the predictive machine learning models are operating in batch mode, may be an alert to the predictive machine learning models to go offline and re-train for later deployment.

Furthermore, in accordance with some embodiments of the present disclosure, the at least one real concept drift related action which takes place when the predictive machine learning models are operating online, may be an alert to the predictive machine learning models to adjust to changing trend of statistics.

Furthermore, in accordance with some embodiments of the present disclosure, the DD module may receive a posterior distribution from the incremental estimator and the static estimator.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

FIG. 10A shows data characteristics of HyperPlane and SEA, in accordance with some embodiments of the present disclosure;

FIG. 10B shows average classification accuracy and number of drifts detected, in accordance with some embodiments of the present disclosure;

DETAILED DESCRIPTION

Figure 1:
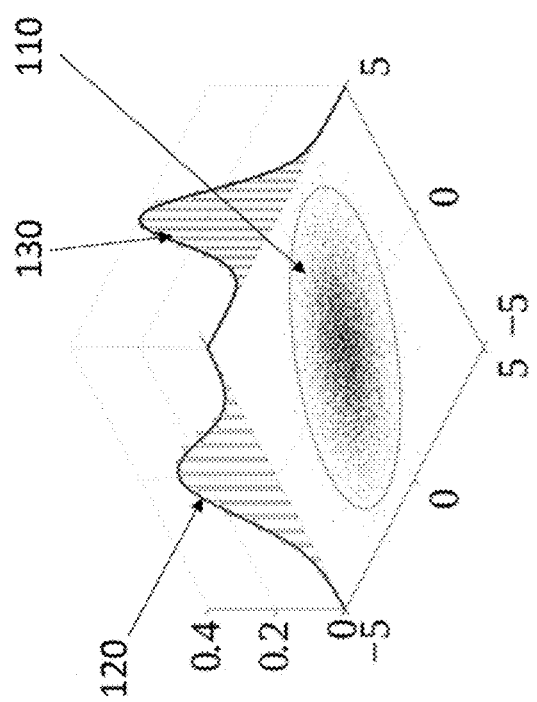
FIG. 1 schematically illustrates sample observations from a joint probability distribution, in accordance with some embodiments of the present disclosure.

In the following detailed description, numerous specific details are set forth in order to provide a thorough understanding of the disclosure. However, it will be understood by those of ordinary skill in the art that the disclosure may be practiced without these specific details. In other instances, well-known methods, procedures, components, modules, units and/or circuits have not been described in detail so as not to obscure the disclosure.

Although embodiments of the disclosure are not limited in this regard, discussions utilizing tennis such as, for example, "processing," "computing," "calculating," "determining," "establishing", "analyzing". "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

As used herein, the term "dataset" refers to a collection of data. In a tabular data every column represents a variable, i.e. a feature.

As used herein, the term "instance" refers to a data point or an element in a dataset. It is a record having 'd' features i.e., fields which are containing the data about e.g., a financial transaction or any other data that the operation of the predictive machine learning is based on.

As used herein, the term "synthetic dataset" refers to a repository of instances that has been generated programmatically to assist a machine learning models professional to conduct experiments.

As used herein, the term "hyperplane" refers to a synthetic dataset.

As used herein, the term "Stream Ensemble Algorithm (SEA)" refers to a synthetic dataset.

As used herein, the term "window" refers to a preconfigured amount of 'n' instances.

As used herein, the term "concept" refers to the quantity to be predicted. It may refer to other phenomena of interest besides the target concept, such as statistical distribution, trends and statistical moments.

As used herein, the term "concept drift" refers to the target variable.

As used herein, the term "reliable labeled instance" or "reliable data" or "reliable label" refers to an extracted instance which was manually labeled by an expert. Each reliable labeled instance has a cost. Commonly, it considers the time that requires by a subject matter expert or domain expert to decide on the right label to the instance.

As used herein, the term "sensitivity" refers to a measurement of predictive machine learning models. It is calculated as the ratio between true positive detections of the predictive models out of the sum of true positive detections and false negative detections of the predictive machine learning models.

As used herein, the term "likelihood function" refers to a function that measures the fit of a statistical model to a sample of data for given values of the unknown parameters. The likelihood function in this context determines the level of similarity of one distribution and another distribution. Meaning, how much is it likely that one distribution fits the other distribution. Commonly the fit doesn't have to be 100%, but there should be a certain level of fit e.g., 90%, 85% and the like.

As used herein, the term "end-user" refers to an expert or a professional or an agent that is capable of providing ground-truth as to labeled instances thus turning the labels into reliable labels. For example, determining if an instance that is labeled as "fraud" is indeed fraud or "clean".

The terms "machine learning applications" and "machine learning models" are interchangeable.

As used herein, the term "Analytics Authoring Environment (AAE)" refers to a user interface that allows building of fraud solutions while still using another platform for data integration, detection and decisions. AAE offers self-sufficiency to tackle new threats, adapt for new products, and detect fraud in non-traditional financial institution business models.

As used herein, the term "Analytics Intelligence Server (AIS)" refers to an analytics engine.

The terms "attributes" and "features" are interchangeable.

As previously described many real-world applications such as credit card fraud detection, mining of user interest, and network traffic monitoring, rely heavily on data streams. In these machine learning applications, the relations and patterns in data, evolve over time, which causes predictive learning models to become outmoded or not relevant. The challenge in learning from real-world domain is that the concept of interest depends on some hidden context which is usually captured in the form of predictive attributes. Often, the change of uncaptured hidden context in data attributes are the cause of concept drift which makes the learning task more complicated.

For example, of a concept drift in a fraud detection application, where the target concept may be a binary attribute fraudulent with values "yes" or "no" that indicates whether a given transaction is fraudulent.

According to some embodiments of the present disclosure, a concept drift refers to the change in joint distribution of the input variables 'X' and a target variable 'y' over time as shown in FIG. 1. FIG. 1 shows a sample of observations 110 from a joint probability distribution and the marginal distribution 120 and 130 respectively.

In the context of machine learning models, the target variable 'y' may be a label variable of a set of given features, 'X'. Hence, studies of concept drift in machine learning context, focuses on how the given set of input variables 'X' affects the target variable 'y'.

Figure 2:
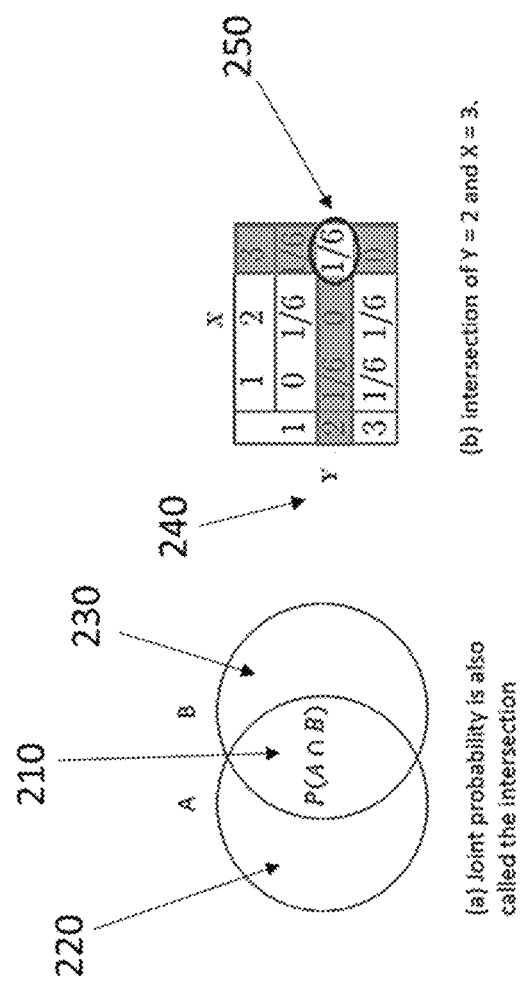
FIG. 2 schematically illustrates a joint probability, in accordance with some embodiments of the present disclosure.

In other words, concept drift is related to the change of distribution 'X', p(X) and the change of distribution 'y' given 'X', p(y|X) as shown in FIG. 2. FIG. 2 shows a joint probability which is also named an intersection 210. The probability that both events 'A' 220 and 'B' 230 occur is equal to the probability that event 'A' 220 occurs times the probability that event 'B' 230 occurs, given that event 'A' has occurred. For example, when event 'A' 220 is when y=2 then the probability of event 'A' 220 is ⅓ and when event 'B' is when x=3 the probability is ½, then the intersection P(A∩B) is P(A)*P(B|A) i.e. ⅓*½=⅙, as shown by element 250.

Current online machine learning techniques handle concept drift by learning incrementally from it. However, such incremental learning may be unsatisfactory in fraud detection, intrusion detection and online sentiment analysis because the relation between parameters may not be static over time due to hidden context which may yield in concept drift. Accordingly, there is a need for a technical solution that will detect concept drift so that a machine learning model may take appropriate reflection actions against concept drifts to provide a more accurate prediction and hence become an essential component in the data stream learning.

Supervised machine learning methods require data labels of all instances in the received data stream in order to compute performance-based measurement to sequentially monitor concept drift. However, the assumption of full availability of data labels is not applicable as the process of labeling all the information might be expensive. Usually the cost of labeling considers the time requires by a subject matter expert or a domain expert to decide on the correct label for the instance.

Semi-supervised machine learning methods focus on learning and adapting to data streams with the presence of concept drift and with only a portion of data labels. Unsupervised machine learning methods assume no data labels are available in the streaming environment and focus more on detecting data distribution drift.

A real concept drift refers to the changes in p(y|X), which affects the decision boundaries or the target concept and may only be detected with the availability of data labels. Virtual concept drift is the result of a change in p(X), and subsequently in p(X|y), but not in p(y|X). That is, a virtual concept drift is a change in the distribution of the incoming data which implies that the decision boundaries remain unaffected. Virtual concept drift does not capture the change in p(y). Whereby, p(y) is prior probability distribution and p(X|y) is a class conditional probability distribution. As described in "McDiarmid Drift Detection Methods for Evolving Data Streams,", A. Pesaranghader, H. L. Viktor and E. Paquet, 2018, International Joint Conference on Neural Networks (IJCNN), Rio de Janeiro, 2018. pp. 1-9, doi: 10.1109/IJCNN.2018.8489260, hereby incorporated by reference.

Currently, predictive performance feedback is used to handle the real concept drift in supervised methods. However, due to the limitation of data label availabilities in semi-supervised and unsupervised machine learning methods, they are unable to compute sequential performance measurement to detect real concept drift. Therefore, these methods do not efficiently resolve real concept drift.

According to some embodiments of the present disclosure, the prior probability represents what is originally believed before new evidence is introduced, and posterior probability takes this new information into account. Therefore, posterior probability distributions may be a better reflection of the events characteristics which are underlying a data generating process, than the prior probability since the posterior includes more information. A posterior probability can subsequently become a prior for a new updated posterior probability as new information arises and is incorporated into the analysis. The Posterior Distribution=Prior Distribution+Likelihood Function ("new evidence").

According to some embodiments of the present disclosure, the posterior probability associated with class $c\_i$, given instance X, is obtained by the following formula, Equation 1:

$$p(Ci \mid X) = \frac{p(Ci) * p(X \mid Ci)}{p(X)}$$

Whereby,
P(Ci|X) is the posterior probability.
P(Ci) is the class prior probability,
P(Ci|X) is the likelihood, and
P(X) is predictor prior probability $$P(C|X)=(P(X1|C)*P(X2|C)* \ldots P(Xn|Xn)*P(C)$$

As described in "McDiarmid Drift Detection Methods for Evolving Data Streams,", A. Pesaranghader, H. L. Viktor and E. Paquet, 2018, International Joint Conference on Neural Networks (IJCNN), Rio de Janeiro, 2018, pp. 1-9, doi: 10.1109/IJCNN.2018.8489260, hereby incorporated by reference.

In a non-limiting example, to predict a posterior probability, suppose there are three acres' of land labeled as A, B and C. It is known that one acre, out of the three, has reserves of oil bellow its surface, while the other two acers, do not. The prior probability of oil in acre C is one-third or 33%. A drilling test is conducted on acre B, and the results indicate that no oil is present at the location. Therefore, with acre B eliminated, the posterior probability of acre C containing oil becomes 0.5, or 50%.

Where $p(x)=\Sigma_{i=1}^{m}P(Ci)P(X|Ci)$ is marginal probability distribution. If concept drift occurs in between time $t_0$ and $t_1$, then the following formula takes place.

$$\exists x(Pt_0(x,y) \neq Pt_1(x,y)) \qquad \text{Equation 2:}$$

Whereby,
$t_0$ and $t_1$ represent joint probability distributions of times $t_0$ and $t_1$, respectively. As described in www.investopedia.com/terms/p/prior_probability.asp, hereby incorporated by reference.

According to some embodiments of the present disclosure, Equation 2 implies that data distribution of times $t_0$ and $t_1$ are distinct, as their joint probabilities differ from Equation 1, it may be observed that a concept drift may occur as a result of change in: (i) prior probability distribution of classes P(y); (ii) the class conditional probability distributions p(X|y); and posterior probability distribution of classes p(y|X), thus affecting classification decision boundaries.

According to some embodiments of the present disclosure, a computerized-method for real-time detection of real concept drift in predictive machine learning models, which is a semi-supervised framework, is provided to address real concept drift under a realistic streaming environment, where there are little to no data labels. The semi-supervised framework may incorporate Positive Unlabeled Learning to discover reliable labeled data, i.e. the estimated data labels are inferred or extracted for the unlabeled data with high confidence. An active module may learn from labeled data which has been confirmed as ground truth by an expert as to the unlabeled data. In addition, to assist the active learner, a human may label the unlabeled data.

According to some embodiments of the present disclosure, the posterior probabilities from the current reliable labeled data may be compared to the posterior probabilities, which may be generated from an incremental estimator which learns incrementally from previous reliable labeled data that has been obtained. A density estimation may be used as a comparison method for these posterior probability distributions because statistical comparison methods are unstable for distributions which are partially labeled. The estimated density of posterior probability distributions may be low when concept drift occurs.

Figure 3:
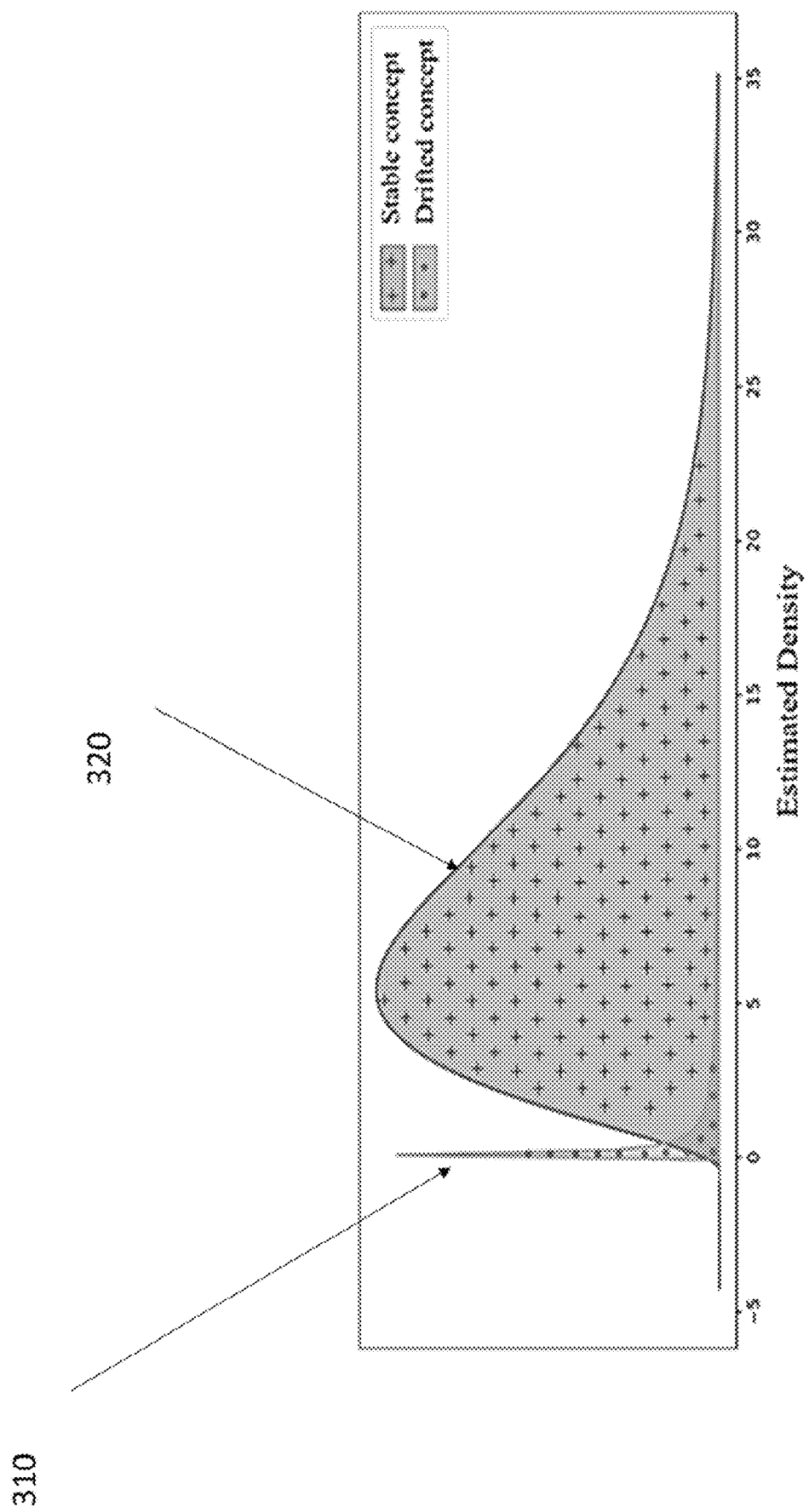
FIG. 3 schematically illustrates an example of distributions of estimated densities for a. HyperPlane dataset, in accordance with some embodiments of the present disclosure.

FIG. 3 schematically illustrates an example of distributions of estimated densities for a HyperPlane dataset, in accordance with some embodiments of the present disclosure. FIG. 3 shows the estimated density distributions before and during an incident when a concept drift occurs. When a concept drift occurs, the estimated densities 310 concentrate around estimated density equals zero whereas the posterior probability distribution before concept drift has occurred may be widely spread 320.

There is a need for a method that has the ability to learn and adapt in a streaming environment with the presence of real concept drift when there is little to no data labels available. There is a need in a method that have the ability to detect the real concept drift that is occurring under such conditions.

Since real world events are dynamic and not static, and because it is unreliable to compare distributions which were generated from partially labeled data, there is a need for a method and system for concept drift detection that may compare posterior probability distributions for partially labeled data streams based on density estimation and not based on statistical information of the posterior probability distributions which is static in its nature. As described in "The problem of concept drift: definitions and related work", Alexey Tsymbal Department of Computer Science Trinity College Dublin, Ireland, Apr. 29, 2004. TCD-CS-2004-15, hereby incorporated by reference.

According to some embodiments of the present disclosure, a data stream 'D' may be given with a set of input variables $X \in R^d$ whereby 'd' is the number of features. The given data stream 'D' may be divided into 'W' windows of instances of size 'n'. The target variable 'Y' of the input variables X within 'W' may be either labeled 'L' or unlabeled 'U'. Detecting the change in probability of y given X i.e., $p(y|X)$.

Conventional methods to detect changes in $p(y|X)$ require all y in 'W' to be hilly labeled. These methods store a historical $p(y|X)$ old as a reference to be compared with the current $p(y|X)$. In a streaming environment, 'W' comes in high velocity and volume. It is impractical to either assume that all y in 'W' windows are 'L' variables or to store all X for further processing due to memory limit. Hence, there is a need for a technical solution to detect the changes in $p(y|X)$ distribution with only limited variables available in 'W' windows without storing any historical $p(y|X)$ old for reference.

Figure 4:
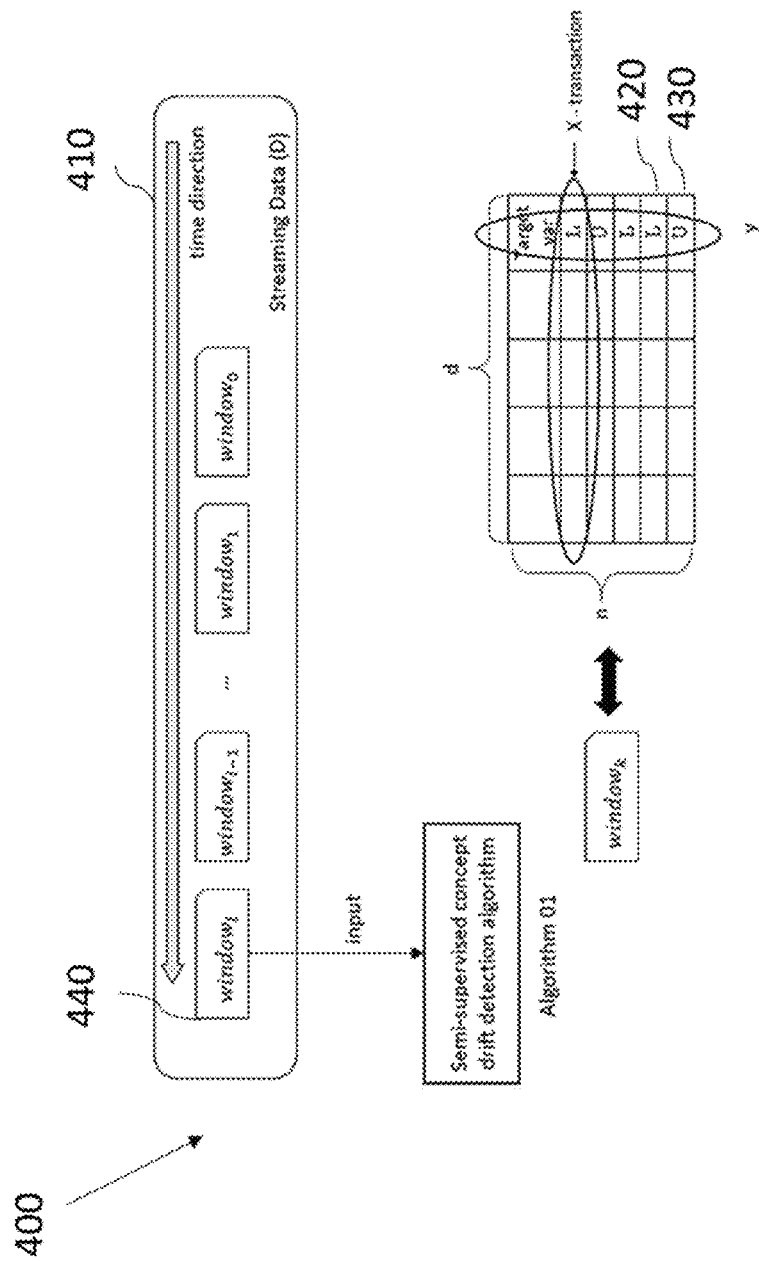
FIG. 4 schematically illustrates a streaming data process having a data window per time period, in accordance with some embodiments of the present disclosure.

FIG. 4 schematically illustrates a streaming data process 400 having a data window per time period 410, in accordance with some embodiments of the present disclosure.

Figure 5:
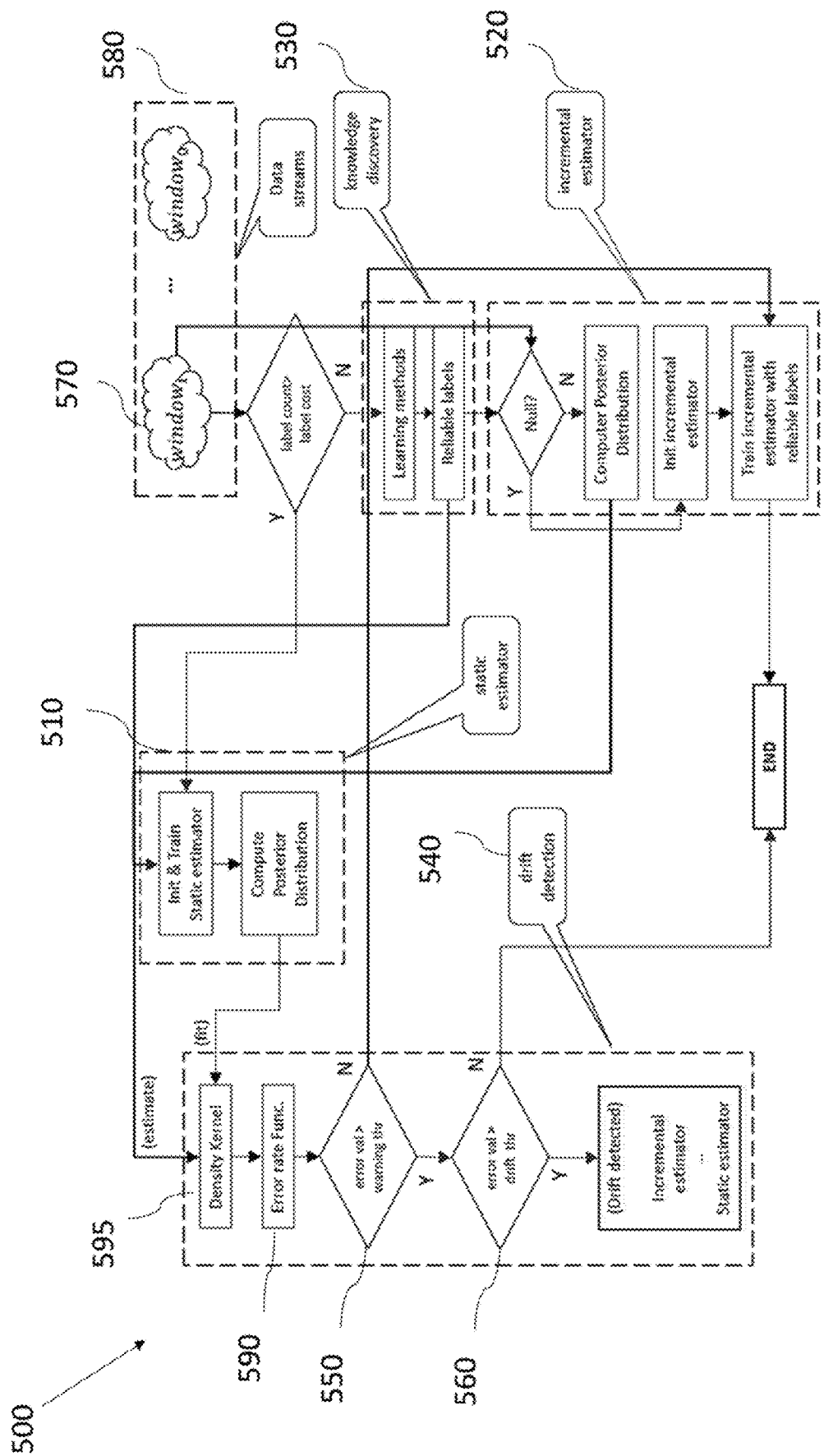
FIG. 5 is a high-level workflow of method for detecting real connect drift, for one data window, in accordance with some embodiments of the present disclosure.
Figure 6:
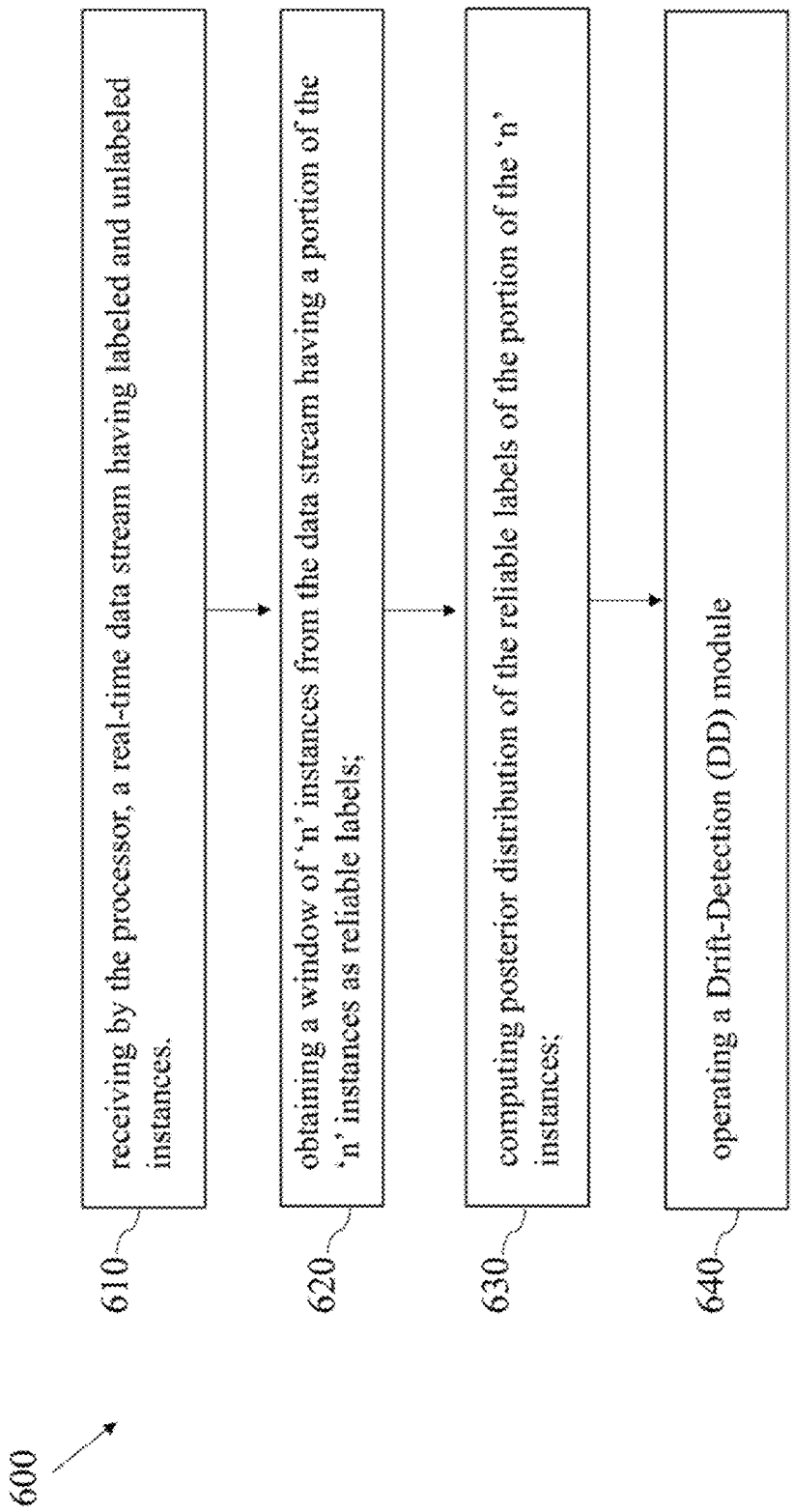
FIG. 6 is representing a flowchart depicting operations performed by a method for detecting real drift detection, in accordance with some embodiments of the present disclosure.

According to some embodiments of the present disclosure, a method for real concept drift detection such as the method for real concept drift detection 500 in FIG. 5 and the method for real concept drift detection 600 in FIG. 6, may learn from a received data stream 410 that is comprised of 'W' windows having 'n' instances which are labeled 'L' and unlabeled 'U'. The 'n' instances are with limited 'L' variables 420, i.e., labeled instances, in 'W' windows, by applying different learning methods that discover reliable labeled data, named RL, and later on operate on the unlabeled portion, 'U' variables 430 of 'W' windows 410 or 580 in FIG. 5. An expert may turn labeled instances into reliable data, RL and the learning method may use it later on the unlabeled data. Each window in the 'W' windows 410 or 580 in FIG. 5, includes 'n' instances.

FIG. 5 is a high-level workflow of a method for detecting real connect drift, for one data window, in accordance with some embodiments of the present invention.

Figure 7:
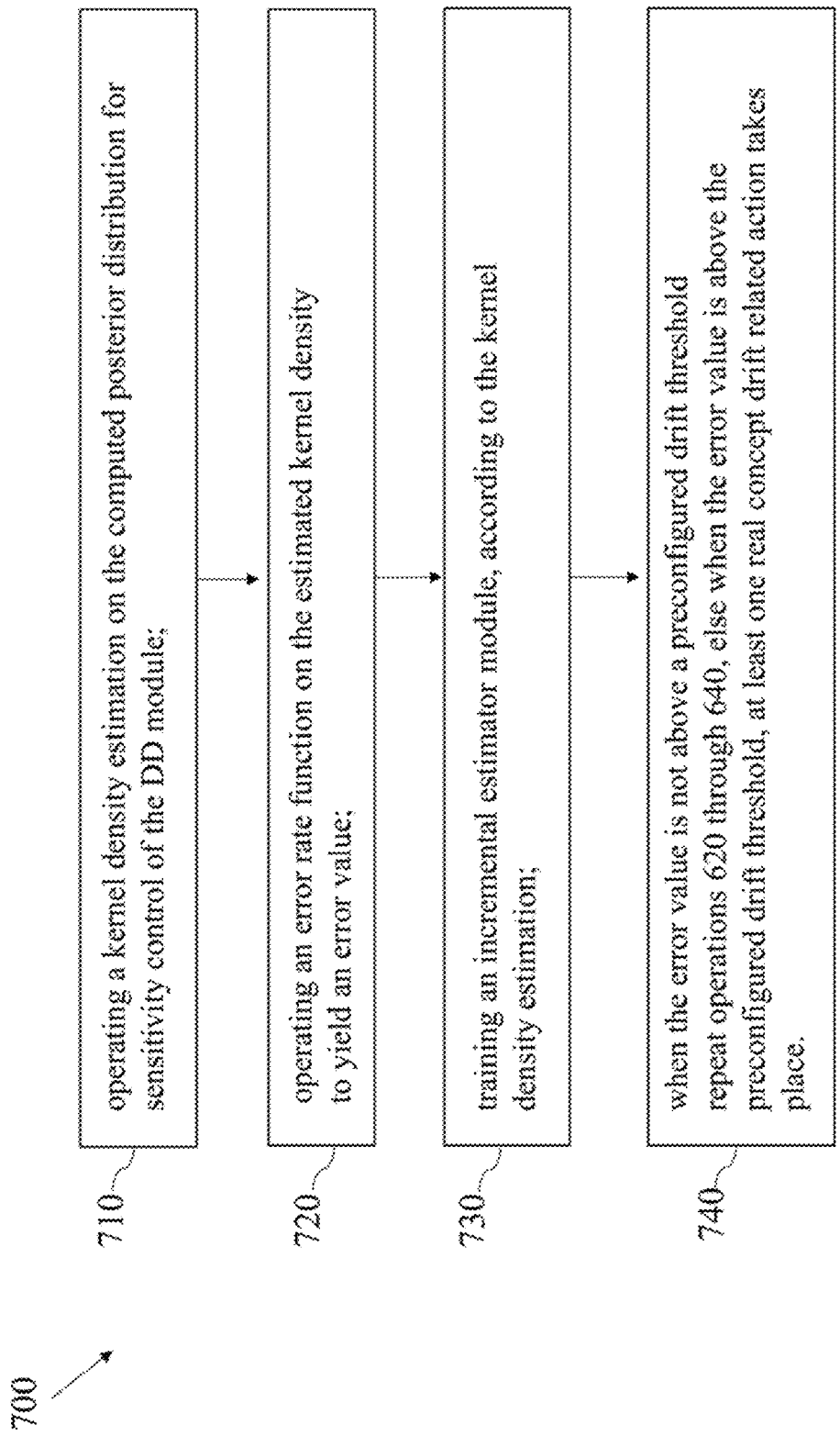
FIG. 7 is representing a flowchart depicting operations performed by a. Drift Detection module, in accordance with some embodiments of the present invention.

According to some embodiments of the present disclosure, the method for detecting real concept such as the method for detecting real concept drift 500 in FIG. 5, the method for detecting real concept drift 600 in FIG. 6 and the Drift Detection (DD) module 700 in FIG. 7, may detect changes in $p(y|X)$ by monitoring the posterior distributions directly from RL data and utilize the densities of $p(y|X)$ distributions instead of its statistical information to detect real concept drift.

According to some embodiments of the present disclosure, to handle limited memory resources, instead of storing the reference $p(y|X)$ old for comparison, the method for detecting real concept, such as the method for detecting real concept drift 500 in FIG. 5 the method for detecting real concept drift 600 in FIG. 6 and the DD module 700 in FIG. 7 may represent the current and previous concepts using two different estimators: a static estimator 510 and an incremental estimator 520.

According to some embodiments of the present disclosure, the method for detecting real concept such as the method for detecting real concept drift 500 in FIG. 5 the method for detecting real concept drift 600 in FIG. 6 and the DD module 700 in FIG. 7 may comprise a Knowledge discovery (KD) module 530. The KD module may discover the data labels from unlabeled data stream data by using various learning methods to obtain portions of labels depending on the labeling budget allowed.

According to some embodiments of the present disclosure, the method for detecting real concept such as the method for detecting real concept drill 500 in FIG. 5 the method for detecting real concept drift 600 in FIG. 6 and the DD module 700 in FIG. 7 may comprise an incremental estimator 520 which may act as a base learner to incrementally learn from reliable labeled data. The reliable labeled data may be received from other components in the system (not shown) or it may be received from a Knowledge Discovery (KD) module such as KD module 530. The posterior probabilities from the incremental estimator 530 may represent the concepts of previous data window, when the current window is 'Wi' 570.

According to some embodiments of the present disclosure, the method for detecting real concept such as the method for detecting real concept drift 500 in FIG. 5 the method for detecting real concept drift 600 in FIG. 6 and the DD module 700 in FIG. 7 may comprise a static estimator 510 which may be initialized and trained directly from reliable labeled data that is received from the KD module 530 for every data window 410. The posterior distribution computed from the static estimator 510 may represent the incoming data window 'Wi' 570 and 440 in FIG. 4.

According to some embodiments of the present disclosure, the method for detecting real concept such as the method for detecting real concept drift 500 in FIG. 5, the method for detecting real concept drift 600 in FIG. 6 may comprise a drift detection module such as Drift Detection (DD) module 700 in FIG. 7, which may utilize the density of posterior distributions from both the incremental estimator 520 and the static estimator 510. The purpose of adopting posterior distributions densities is to detect a real concept drift. The drift detection module 540, such as DD module 700 in FIG. 7, which may operate an error rate function 590 to determine the diffusion of both distributions.

According to some embodiments of the present disclosure, when the error rate value drops below a specified drift threshold, a concept drift may be detected.

According to some embodiments of the present disclosure, to detect a gradual drift, a warning threshold 550 may be used to stop the base estimator module i.e., the incremental estimator from learning incrementally. This is to further verify when a concept drift is about to happen or when it is just a weak estimate of the density of the posterior distribution. When a gradual drift is about to happen, the error rate value may continue to drop until the drift threshold is reached.

Pseudo-Code of Semi-Supervised Concept Drift Detection Module 500 in FIG. 5

```
Input:
    n window size
    C_L labeling cost
    L labeled instance
    U unlabeled instance
    W window W ∈ { (X_0 y_0 ∈ {L,U}) . . . (X_n y_n ∈ {L,U})}
    i.est incremental estimator   i_est = Null
    ţ drift threshold
    ϱ warning threshold
    s.est static estimator
    KD knowledge discovery function
    RL reliable labeled data
Output:
    Detected differences by incremental estimator and static estimator
during real-time streaming
    Loop
    Obtain W from data stream D
    RL = 0                          // Init empty set for reliable labels
    If W[y=-L].count( ) /n < C_L do
        RL = KD(w)                  // Obtain reliable labels
    RL = RL ∪ W [y=-L]
    s.est = Hoeffding tree ( )      // static estimator
    s.est = s.est.train(RL)         // train static estimator
    s.p~N(0,1) = posterior_pr (RL.X, RL.y)
    K.e = Kernel.Density.fit(s.p)   // fit density kernel
    If i_est == Null do
        i_est = Hoeffding tree ( )      // incremental estimator
        s.est = s.est.train(RL)         // train incremental
                                           estimator
    else
        i.y = i.est.predict(W)
        i.p~N(0,1) = posterior_pr (W, i.y)
        p̂ = K.e.estimator (p2)          // estimate density
        p̂ = scale [0, 50.e^{-4n} + δ ]   // sensitivity control
        ε = erf (p̂ )                    // error rate function
    If ε < ϱ      do                    // below warning threshold
        If ε < ţ do                     // below drift threshold
            i_est = s.est               // replace incremental
                                           estimator
    else
        i.est = i.est.train(RL)
```

According to some embodiments of the present disclosure, the KD module 530, requires labels to estimate the real concepts from the data stream 580 and 410 in FIG. 4. Without labels, concepts are merely just a representation of the data attributes distribution which does not capture the relationship between the class and the data attributes.

According to some embodiments of the present disclosure, reliable labeled data may be extracted from unlabeled or partially labeled data stream. Various learning methods may be used to obtain reliable labels from the data stream 580 and 410 in FIG. 4.

According to some embodiments of the present disclosure, the process of obtaining data labels may be expensive. Therefore, depending on the available labeling budget, the method for detecting real concept such as the method for detecting real concept drift 500 in FIG. 5, the method for detecting real concept drift. 600 in FIG. 6 and the DD module 700 in FIG. 7 may only extract the portion of labeled data that is in the available labeling budget. For example, counting the labeled instances 'L' in the 'n' instances and then multiplying a labeling cost of an instance by the counted labeled instances to yield a total cost. The total cost may be compared to a preconfigured labeling budget to check that it is not higher than the preconfigured labeling budget.

According to some embodiments of the present disclosure, in case the total cost is not higher than the preconfigured labeling budget, the incremental estimator module such as incremental module 530 may learn incrementally from either received reliable labeled data or from the reliable labeled data that has been extracted from the KD module, such as KD module 530. Before the incremental estimator module 530 i.e., learns incrementally from the current reliable labeled data, the posterior probabilities may be first estimated by predicting the target variable 'y' e.g., fraud or clean instance, for an incoming data window 570. Hence this estimated posterior probability distribution represents the concepts of previous data window.

According to some embodiments of the present disclosure, the KD module, such as KD module 530 may operate a Positive Unlabeled Learning (PUL). Positive-unlabeled learning is an important sub-paradigm of semi-supervised learning, where only the labeled data points i.e., instances available are positive, when the data stream 580 and 410 in FIG. 4 arrives with only partial positively labeled data. As positive labels are already available, PUL may be used to extract the reliable negative data. When the unlabeled portion of the data is a mix of negative and positive instances it is useless. Therefore, the method for detecting real concept such as the method for detecting real concept drift 500 in FIG. 5 and the DD module 600 in FIG. 6 may employ a biased learning technique to extract reliable negative data with random sampling technique similar to an active learning method. The biased learning method may treat all unlabeled data as negative data and may train a classifier with the data.

According to some embodiments of the present disclosure, while only a certain percentage of the positive data are labeled, the method for detecting real concept drift 500 in FIG. 5 the method for detecting real concept drift 600 in FIG. 6 and the DD module 700 in FIG. 7 may randomly draw the same percentage of the positive data from the negative data sample to obtain uniformly distributed negative instances to avoid bias sampling.

According to some embodiments of the present disclosure, a static estimator module, such as static estimator 510 may train based on the current reliable labeled data. The method for detecting real concept drift 500 in FIG. 5 the method for detecting real concept drift 600 in FIG. 6 and the DD module 700 in FIG. 7 may represent the concepts of current data window 570 by using the posterior probability distribution which has been computed from the current reliable labeled data.

According to some embodiments of the present disclosure, the incremental estimator 520 and static estimator 510 may be any learner that is able to learn incrementally with the type of data in the data stream 580 and 410 in FIG. 4.

According to some embodiments of the present disclosure, the static estimator 510 may act as a replacement backup for the incremental estimator 520. The static estimator 510 and incremental estimator 520 which are chosen, may have a similar classification performance on a given type of data. The type of data may be for example, financial transactions.

According to some embodiments of the present disclosure, unlike most semi-supervised methods which focus on the change in data attribute distribution p(X), the drift detection module such as DD module 700 in FIG. 7, and the incremental estimator module, such as incremental estimator module 520 may utilize the limited labeled data from the knowledge discovery module, such as KD module 530 to compute the posterior probabilities for the concept drift detection.

According to some embodiments of the present disclosure, posterior probability distribution which is the posterior probability for a targeted variable 'y' given an input variable 'X' is provided by the following formula, Equation 1':

$$p(y \mid x_i) = \frac{p(x_i \mid y) \times p(y)}{p(x_i)}$$

According to some embodiments of the present disclosure, the 'y' in the equation may represent the target variable that is being monitored, where $X_i$ is one of the data attributes i.e., features from the input variable 'X'. For example, the target variable 'y' may be classification of an instance i.e., financial transaction as "fraud" or "clean". The 'X' may be an attribute of the financial transaction such as the amount transferred in the transaction or the location of the recipient.

Current approaches that detect virtual drift, compute p(X) directly from the input variable 'X', ignore the changes in p(y). Hence, detecting virtual drift which is also the change in p(X) does not necessarily capture the change in p(y). The change in p(y) is known as the change in prior belief which is important as there are many other hidden contexts which are usually uncaptured in the data attributes which are affecting the learning tasks of the machine learning models.

According to some embodiments of the present disclosure, the method for detecting real concept drift 500 in FIG. 5 and the method for detecting real concept drift 600 in FIG. 6 may monitor the change in the posterior distribution p(y|X) to capture the overall change in the real concept.

According to some embodiments of the present disclosure, the method for detecting real concept drift 500 in FIG. 5 may compute for each estimator, the posterior probabilities of the target class of each data instance in the data window, e.g., window 570, with respect to each attribute. For example, p(y|x1), p(y|x2) and p(y|x3) may be computed for a data stream with three features which may be then used for density estimation in the drift detection module, such as DD module 700 in FIG. 7.

FIG. 6 is representing a flowchart depicting operations performed by a method for detecting real drift detection 600, in accordance with some embodiments of the present invention.

According to some embodiment of the present disclosure, operation 610 may comprise receiving by the processor, a real-time data stream having labeled and unlabeled instances.

According to some embodiment of the present disclosure, operation 620 may comprise obtaining a window of 'n' instances from the data stream having a portion of the 'n' instances as reliable labels.

According to some embodiment of the present disclosure, operation 630 may comprise computing posterior distribution of the reliable labels of the portion of the 'n' instances.

According to some embodiment of the present disclosure, operation 640 may comprise operating a Drift-Detection (DD) module such as drift detection module 700 in FIG. 7

FIG. 7 is representing a flowchart depicting operations performed by a Drift Detection module 700, in accordance with some embodiments of the present invention.

According to some embodiment of the present disclosure, operation 710 may comprise operating a kernel density estimation, such as kernel density 595 in FIG. 5 on the computed posterior distribution for sensitivity control of the DD module 700.

According to some embodiment of the present disclosure, operation 720 may comprise operating an error rate function on the estimated kernel density to yield an error value.

According to some embodiment of the present disclosure, operation 730 may comprise training an incremental estimator module, according to the kernel density estimation.

According to some embodiment of the present disclosure, operation 740 may comprise when the error value is not above a preconfigured drift threshold repeat operations 620 through 640 in FIG. 6, else when the error value is above the preconfigured drift threshold, at least one real concept drift related action takes place.

According to some embodiment of the present disclosure, the at least one real concept drift related action which takes place when the predictive machine learning models are operating in batch mode, is an alert to the predictive machine learning models to go offline and re-train for later deployment of the predictive machine learning models.

According to some embodiment of the present disclosure, the at least one real concept drift related action which takes place when the predictive machine learning models are operating online, is an alert to the predictive machine learning models to adjust to changing trend of statistics or the relation between parameters. The adjustment of the predictive machine learning models to changing trend of statistics increases the accuracy of the prediction of the predictive machine learning models, which results with low error rate thereof.

According to some embodiment of the present disclosure, module 700 may be an online machine learning model which learns online i.e., in real-time and incrementally, which means that its learning is adjusted by incoming events or transactions or measures. There may be a short-term memory buffer in the online machine learning model which aggregates latest events and analyzes its trend upon the time window. This task is performed incrementally, thus there is a continuous analysis on the statistics trend.

According to some embodiment of the present disclosure, when a trend occurs, it is absorbed into the online machine learning algorithms by adjusting its learning rate, loss function and other components to a new trend. Since a trend may occur all the time, in an online machine learning system there is no need to alert about a changing trend because it is already incorporated immediately in the online machine learning model.

Figure 8A:
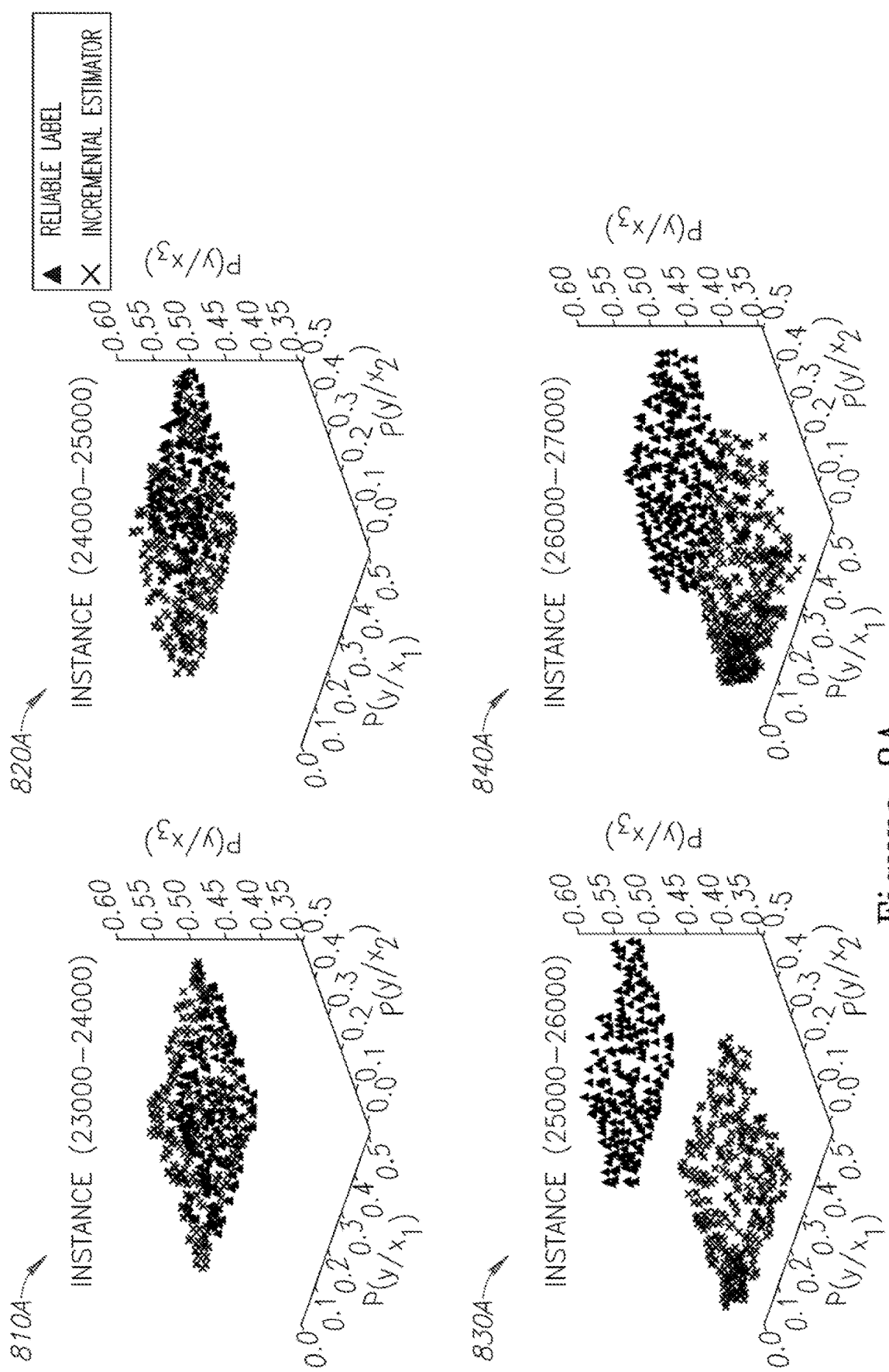
FIG. 8A is a three dimensional graph showing an example of sequential posterior probabilities shift of Stream Ensemble Algorithm (SEA) dataset with 60% labels, in accordance with some embodiments of the present disclosure.

FIG. 8A is a three-dimensional graph showing an example of sequential posterior probabilities shift of Stream Ensemble Algorithm (SEA) dataset with 60% labels, in accordance with some embodiments of the present disclosure.

An example of posterior distribution shifting sequentially is depicted in FIG. 8A. When the number of instances is relatively small such as graph 810A there is no shift between the posterior distribution and the incremental estimator. As the number of instances increases the shift is horizontally and vertically growing. When concept drift occurs at the instance index of 25000 such as shown in 830A, there is a significant difference between both distribution of reliable labels and incremental estimator's which result in a low estimated density.

Figure 8B:
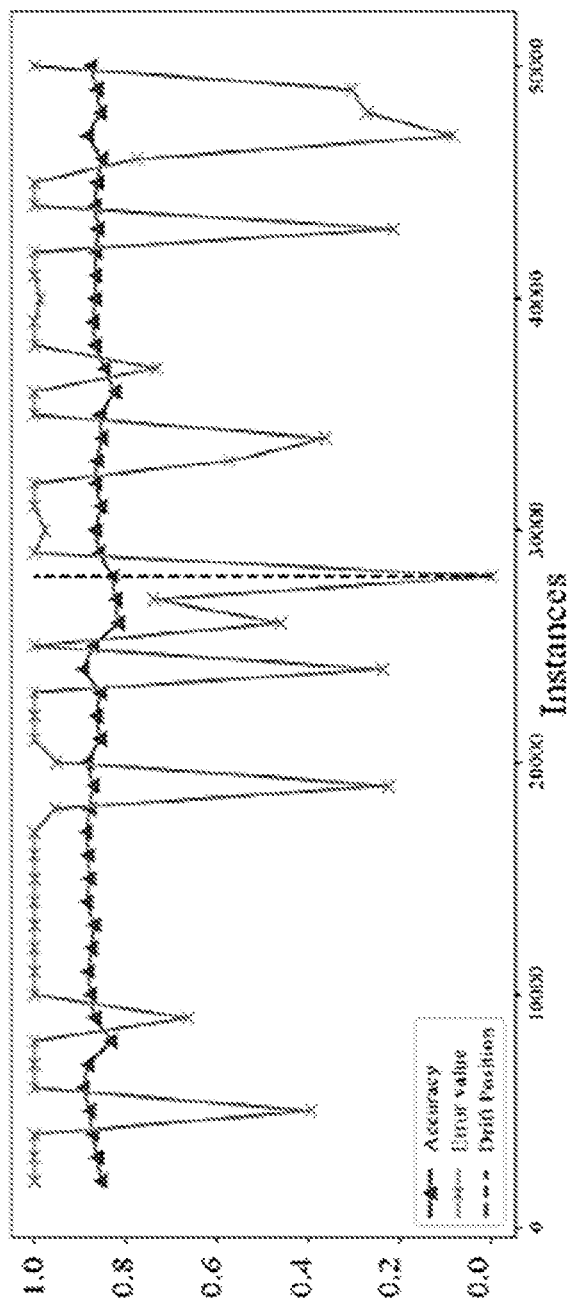
FIG. 8B is a graph showing the accuracy of incremental estimator and error rate value from framework with drift threshold of 0.05 of SEA dataset with 60% labels, in accordance with some embodiments of the present disclosure.

This can also be seen from FIG. 8B which shows the accuracy of incremental estimator and error rate value from framework with drift threshold of 0.05 of SEA dataset with 60% labels, in accordance with some embodiments of the present invention. FIG. 8B shows the graph of the error rate value, accuracy of incremental estimator, and the position where drift is detected.

According to some embodiments of the present disclosure, the density estimation of the two distributions, as the two distributions are computed from different estimators with varying sample size, statistical comparison such as Kolmogorov-Smirnov Test and T-test of the two distributions are often too sensitive and unstable. Another reason that statistical test deemed to be unstable is because only labels in the data window are used. Hence, many uncertainty areas are presented in the data space.

To overcome this challenge, the method for detecting real concept drift 500 in FIG. 5 and the method for detecting real concept drift 600 in FIG. 6 may employ a kernel density estimation such as kernel density 595 in FIG. 5 to estimate the density of the posterior probabilities of classes to each data attributes. The kernel density, such as kernel density 595 in FIG. 5, may be fitted with the reliable labeled data's posterior probabilities to predict the overall densities of the incremental estimator's posterior probabilities.

According to some embodiments of the present disclosure, a number of false alarms may be inversely correlated to a label percentage. A false alarm is defined as the concept drift that is detected at an incorrect instance location. Hence, a scaling factor as shown in Equation 3 below, may be used to control the sensitivity. This Equation 3 describes the relationship between the number of false alarms and the label percentage.

$$\gamma = 50 \times e^{-4\alpha} + \delta$$

Whereby γ is the scaling factor,
α represents the label percentage that is available in the dataset,
δ is the parameter that controls the overall sensitivity of the method for detecting real concept drift 500 in FIG. 5 and the method for detecting real concept drift 600 in FIG. 6.

Figure 9:
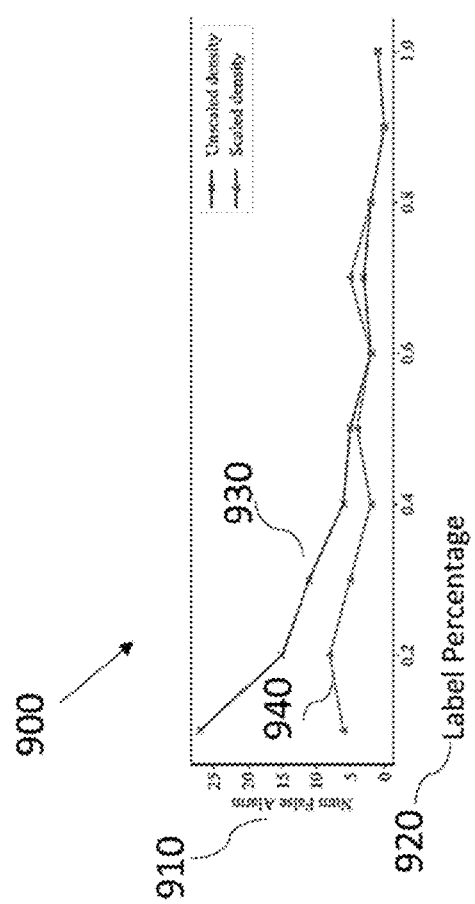
FIG. 9 is a graph that illustrates the relation between false alarm and label percentage, in accordance with some embodiments of the present disclosure.

FIG. 9 is a graph 900 that illustrates the relation between false alarm 910 and label percentage 920, in accordance with some embodiments of the present disclosure. Line 940 shows that fewer false alarm were detected after applying the scaling factor to the estimated density distribution compared to line 930 which has applied unsealed density.

According to some embodiments of the present disclosure, the method for detecting real concept drift 500 in FIG. 5 and the method for detecting real concept drift 600 in FIG. 6 may detect concept drift by measuring the diffusion of the estimated density. The diffusion measurement may be described by Equation 4 below, which is also a function of an error rate such as error function 595 in FIG. 5 with an output value of [0,1], Where 0 indicates a concept drift and 1 indicates a stable concept. Equation 4:

$$erf(x) = \frac{1}{\sqrt{\pi}} \int_0^x e^{-t^2} dt$$

According to some embodiments of the present disclosure, this error rate function such as error function 595 in FIG. 5, is a sigmoid function for probability and statistic distribution to describe diffusion of the data. The 'X' in Equation 4, is the average density.

FIG. 10A shows data characteristics of HyperPlane and SEA, in accordance with some embodiments of the present disclosure. Four datasets have been used in the experiments: two synthetic and two real datasets as shown in FIG. 10A.

Hyper-Plane and SEA are synthetic datasets generated from Massive Online Analysis (MOA). MOA is a software environment for implementing algorithms and running experiments for online learning from evolving data streams. MOA includes a collection of offline and online methods as well as tools for evaluation.

FIG. 10B shows average classification accuracy and number of drifts detected, in accordance with some embodiments of the present disclosure. The average accuracy does pot determine the ability to detect concept drift.

Different percentages of labels were experimented. The average accuracy throughout the experiment has been compared to show that the performance of the method for detecting real concept drift 500 in FIG. 5 and the method for detecting real concept drift 600 in FIG. 6 is comparable to other methods.

Experiments have also been conducted to check the ability of the method for detecting real concept drift 500 in FIG. 5 and the method for detecting real concept drift 600 in FIG. 6 compared to other methods. For the Hyperplane data set, concept drift is simulated at the instance index 75000. Three concept drifts are simulated in the SEA dataset which are at the instance indices of 25000, 50000 and 75000.

According to some embodiments of the present disclosure, the experiment results show that with a small percentage of labels which are available, the implementation of the method for detecting real concept drift 500 in FIG. 5 and the method for detecting real concept drift 600 in FIG. 6 is able to detect concept drift and achieve comparable classification performance to other methods.

According to some embodiments of the present disclosure, comparison of the method for detecting real concept drift 500 in FIG. 5 and the method for detecting real concept drift 600 in FIG. 6 with several supervised drift detection techniques i.e. Drift Detection Method (DDM), Early Drift Detection Methods (EDDM). Adaptive Sliding Window Algorithm (ADWIN), and Page Hinckley (PH) Test.

An EDDM may be used with any learning algorithm in two ways: using it as a wrapper of a batch learning algorithm or implementing it inside an incremental and online algorithm. The experimentation results compare the method for detecting real concept drift 500 in FIG. 5 and the method for detecting real concept drift 600 in FIG. 6 (EDDM) with a similar one (DDM). DDM focuses on the overall error rate, it fails to detect a concept drift unless the sum of false positive and false negatives changes. This limitation is accentuated when detecting concept drift in imbalanced classification tasks.

An EDDM was proposed to achieve better detection results when dealing with slow gradual changes via monitoring the distance between the two classification errors. However, it requires to wait for a minimum of 30 classification errors before calculating the monitoring statistic at each decision point which is not well suited for imbalanced data.

ADWIN is an algorithm which detects concept drifts on the fly and adapts ML models accordingly. The algorithm maintains an adaptive window which is the basis for computing the ML model. ADWIN shrinks the window by removing old tuples i.e., instances when it detects a concept drift.

Page-Hinckley (PH) test is a sequential adaptation of the abrupt change detection in the average of a Gaussian signal. It monitors a cumulative variable defined as the cumulated difference between the observed values and their mean until the current moment. These techniques were selected because the type of concept drift to be detected is the same i.e., real concept drift.

In the experiments, the data window such as window 440 in FIG. 4 and window 570 in FIG. 5, has been set consistently as 1000 instances and the label percentage varies from 20% to 100%. Hoeffding Tree which is an incremental decision tree learner for large data streams, has been employed as the incremental and static estimator, and posterior probabilities density estimation as drift detection component with 0.05 as drift threshold which signifies that there is 95% confident if a concept drift is detected.

Hoeffding Tree has been used as a base estimator. Similar adaptation strategy is applied across the experiments where a new estimator is built by training from the recent incoming data when a warning is signaled. When a concept drift is signaled, the base estimator has been replaced with a newly trained estimator to quickly adapt to the drift and to minimize classification performance loss.

Figure 11A:
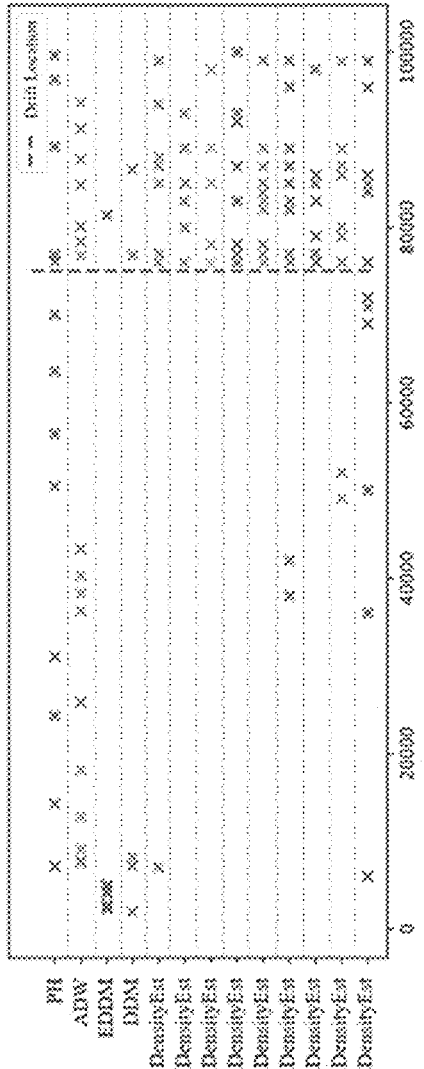
FIG. 11A shows a comparison of detected drift positions of different methods on Hyperplane dataset, in accordance with some embodiments of the present disclosure.
Figure 11B:
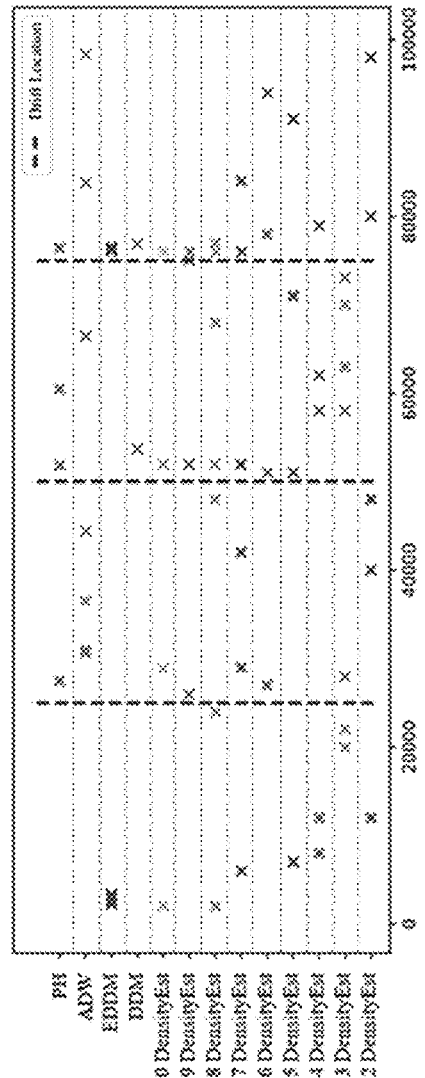
FIG. 11B shows a comparison of detected drift positions of different methods on SEA dataset, in accordance with some embodiments of the present disclosure.

FIG. 11A shows a comparison of detected drift positions of different methods on Hyperplane dataset, and FIG. 11B shows a comparison of detected drift positions of different methods on SEA dataset, in accordance with some embodiments of the present invention.

According to some embodiments of the present disclosure, each 'x' represents a concept drift detection in relation to the number of instances. The larger the number of instances, the more detected concept drifts. Most methods are able to detect the drift in HyperPlane dataset, but the implementation of method for detecting real concept drift 500 in FIG. 5 and the method for detecting real concept drift 600 in FIG. 6 has resulted in fewer false alarms before the concept drift has occurred.

Therefore, the implementation of the method for detecting real concept drift 500 in FIG. 5 and the method for detecting real concept drift 600 in FIG. 6 is able to detect concept drift in both synthetic datasets Hyperplane and SEA, with a few false alarms at lower percentages of label availability.

Early Drift Detection Methods (EDDM) and some low percentages labels in DensityEst did not perform as well on SEA dataset while other methods did detect the concept drift with a few false alarm or delayed detection. Most methods are able to detect the concept drift in HyperPlane dataset, but the implementation of the method for detecting real concept drift 500 in FIG. 5 and the method for detecting real concept drift 600 in FIG. 6, has resulted in fewer false alarms before the concept drift has occurred. This shows that even with partially labeled data, the implementation of method for detecting real concept drift 500 in FIG. 5 and the method for detecting real concept drift 600 in FIG. 6 is able to detect real concept drift while achieving comparable classification performance to other methods.

Figure 12:
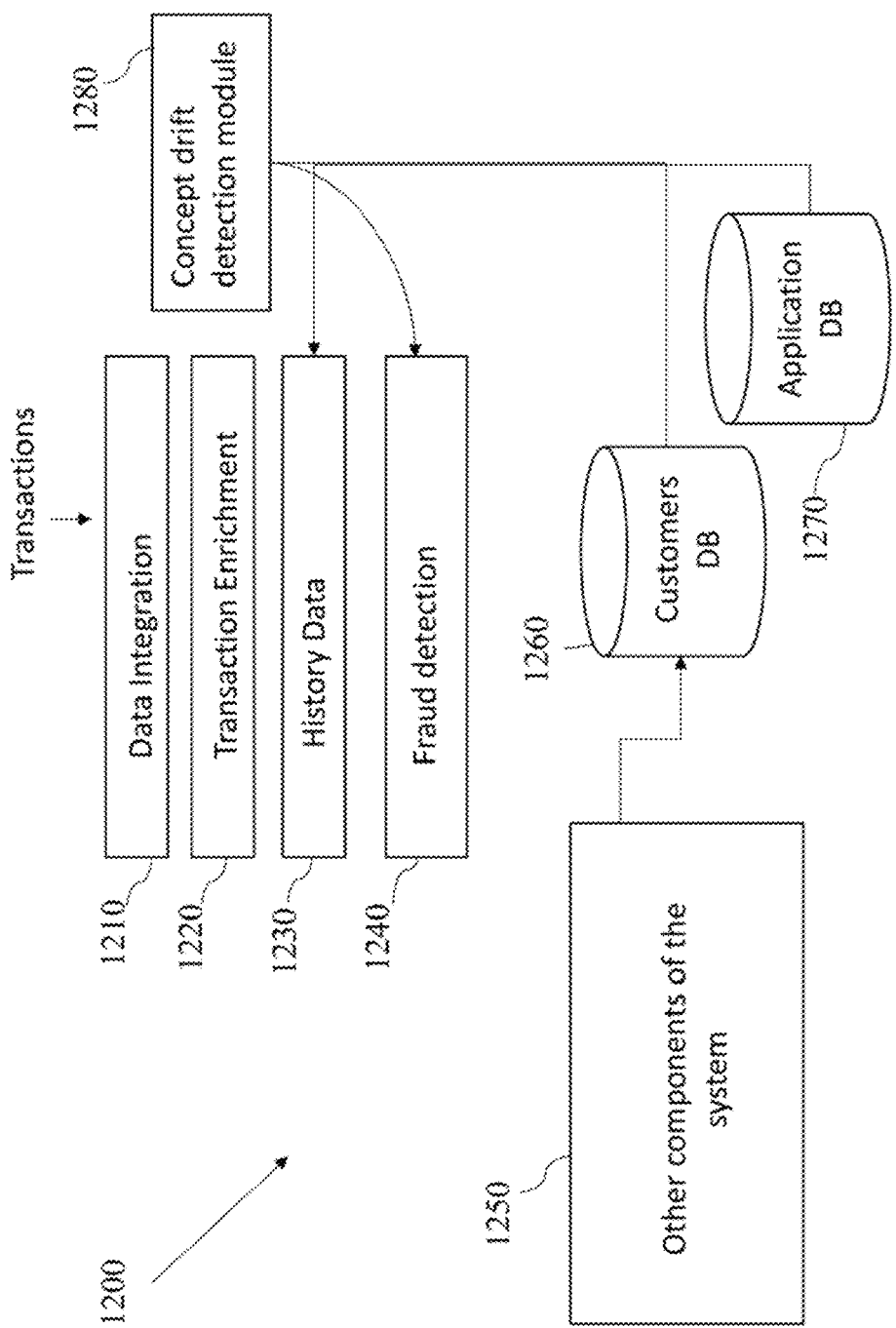
FIG. 12 illustrates a detection module in a global system, in accordance with some embodiments of the present disclosure.

FIG. 12 illustrates a detection module in a global system, in accordance with some embodiments of the present disclosure.

According to some embodiments of the present disclosure, the present disclosure may be implemented by receiving a data stream such as data stream 410 in FIG. 4 and data stream 580 in FIG. 5, comprised of partially unlabeled data, e.g., processed data which may be combined of: (i) data integration from multiple applications such as 1210 (ii) transaction enrichment such as 1220; and (iii) historical data such as 1230, from a global system, such as system 1200, and may operate a fraud detection module 1240. The fraud detection module 1240 may be a predictive module where each transaction gets its risk score. The fraud detection module 1240 may be monitored if it is a batch module and integrated if it is online module by a real concept drift detection method, i.e., a real concept drift detection module 1280, such as the method for detecting real concept drift 500 in FIG. 5 and the method for detecting real concept drift 600 in FIG. 6.

According to some embodiments of the present disclosure, the real concept drift detection module may be implemented by the method for detecting real concept drift 500 in FIG. 5 and the method for detecting real concept drift 600 in FIG. 6.

According to some embodiments of the present disclosure, module 1280 may be a semi-supervised machine learning model to address real concept drift and operate when there is no full availability of data labels.

A policy calculation treats the suspicious risk scores and routes accordingly. Profiles contain aggregated financial transactions according to time period. Profile updates synchronize according to new created/incoming transactions. The risk score management is operated in a RCM component (not shown) which includes: investigation, monitoring, sending alerts, or marking as no risk.

An Investigation IDB system (not shown) may be used when research transactional data and policy rules resulting for investigation purposes. It analyzes historical cases and alert data. Data may be used by the method for detecting real concept drift 500 in FIG. 5 and the method for detecting real concept drift 600 in FIG. 6, or by external applications that can query the database, for example to produce rule performance reports.

Analysts may define calculated variables using a comprehensive context such as the current transaction, the history of the main entity associated with the transaction, the built-in models results etc. These variables may be used to create new indicative features. The variables may be exported to the detection log, stored in IDB system and exposed to users in user analytics contexts.

Transactions that satisfy certain criteria may indicate occurrence of events that may be interesting for the analyst. The analyst can define events that the system identifies and profiles when processing the transaction. This data can be used to create complementary indicative features (using the custom indicative features mechanism or Structured Model Overlay (SMO)). For example, the analyst can define an event such as: amount >$100,000. The system profiles aggregations for all transactions that trigger this event e.g. first time it happened for the transaction party etc.

Once custom events are defined, the analyst can use predefined indicative feature templates to enrich built-in models results with new indicative features calculations. Proceeding with the example above, the analyst can create an indicative feature that says that if it has been more than a year since the customer performed a transaction with amount greater than $100,000 then e.g., add 10 points to the overall risk score of the model.

The SMO is a framework in which the analyst gets all outputs of built-in and custom analytics as input (such as the features above) to be used to enhance the detection results with issues and set the risk score of the transaction.

According to some embodiments of the present disclosure, a filter may be implemented according to an analytics logic, which may be implemented in two phases. Only a subset of the financial transactions may go through the second phase, as determined by a filter.

According to some embodiments of the present disclosure, a detection log may be implemented. The detection log may contain financial transactions which are enriched with analytics data such as indicative features results and variables. The Analyst has the ability to configure which data should be exported to the log and use it for both pre-production and post-production tuning.

According to some embodiments of the present disclosure, a detection flow for transactions may consist multiple operations, data fetch for detection (detection period sets and profile data for the entity), variable calculations, analytics models consisting of different indicative feature instances, and SMO.

According to some embodiments of the present disclosure, a detection process may be triggered for each transaction by module 700 in FIG. 7. However, most of the analytics logic relates to entities rather than transactions. For example, all transactions for the same entity, for example, party, trigger detection, whilst the detection logic is based on the party activity in the detection period.

According to some embodiments of the present disclosure, due to technical performance reasons, the detection flow for transactions may be divided into two phases, phase A and phase B. Analytics logic may run after phase A to decide whether it is necessary to run phase B.

According to some embodiments of the present disclosure, the decision not to proceed to phase B may be due to one of two reasons: either the financial transaction is definitely suspicious or the financial transaction is definitely not suspicious. If it is not yet clear if the transaction is suspicious, the detection processing may continue with phase B detection.

According to some embodiments of the present disclosure, the detection flow in part A may be comprised of: (i) initial fetch; (ii) partial model calculation; (iii) variable enrichment; (iv) SMO model; and filter.

According to some embodiments of the present disclosure, the initial Fetch may fetch the profiles and accumulation period data needed for the detection, for example, for card, it would fetch the card profiles and device profiles and the previous activity by card set. The data which is fetched is used for the detection. Analytics Authoring Environment (AAE) and policy manager component.

According to some embodiments of the present disclosure, the partial model calculation may calculate custom events and may perform analytics models, both internal indicative features and custom indicative features. It may determine the risk score.

According to some embodiments of the present disclosure, the variable enhancements may run phase A variables. According to some embodiments of the present disclosure, the SMO model is an Analytics Intelligence Server (AIS) exit point that may be used by analytics to enrich models having internal indicative features and custom indicative features and to override the determined risk score. The SMO model may recommend whether or not to proceed to phase B, although the final decision is made by the filter.

According to some embodiments of the present disclosure, the detection flow in part B may be comprised of: (i) second fetch; (ii) complete model calculation; (iii) variable enrichments; and (iv) SMO model.

According to some embodiments of the present disclosure, the second fetch may perform a retrieval based on more complex queries, for example, multiple payees per financial transaction.

According to some embodiments of the present disclosure, the complete model calculation may perform additional internal indicative features and custom indicative features for a total 'd' features of each instance.

According to some embodiments of the present disclosure, the variable enhancement may perform more calculations based on newly retrieved sets.

According to some embodiments of the present disclosure, the SMO model may decide the final score for the transaction.

According to some embodiments of the present disclosure, activities are a way to logically group together events that occur in the financial institution systems. Each channel may be an activity, for example, Web activity. Each type of service may be an activity, for example, Internal Transfer activity. Each combination of an activity and a type of service may be an activity, for example. Web Internal Transfer Activity.

According to some embodiments of the present disclosure, activities may span multiple channels and services, for example, the Transfer activity, which is any activity that results in a transfer. Financial transactions may be associated with multiple activities.

According to some embodiments of the present disclosure, activities may be divided into multiple base activities. Base activities may represent the most specific activity the customer has performed and determine which detection models are calculated for a financial transaction. Each transaction may be mapped to one and only one base activity.

According to some embodiments of the present disclosure, a base activity may be calculated for each transaction. This default base activity is determined according to the channel and the transaction type, as well as additional fields and calculations.

According to some embodiments of the present disclosure, the base activity of a financial transaction may be generally set by combining the channel type and the financial transaction type as mapped in data integration. The definition of some base activities is also based on the value of an additional field or a calculated indicator.

According to some embodiments of the present disclosure, for example, a remote banking phone channel:

| Channel | Transaction Type | Additional Fields | Calculated indicators | Base Activity | Base Activity Abr. |
|---|---|---|---|---|---|
| Phone | SelfTransfer | | | phone_selfTransfer | H_ST |
| Phone | InternalTransfer | | isPayeeForegin Country = TRUE | phone_internalInternationalTransfer | H_IIT |
| Phone | InternalTransfer | | isPayeeForegin Country = FALSE | phone_internalDomesticTransfer | H_IDT |
| Phone | Domestic | | actimizeAnalytics CalculatedPayeeis Managed = TRUE | phone_externalDomesticTransferManaged | H_EDT_M |
| Phone | Domestic | | actimizeAnalytics CalculatedPayeeis Managed = FALSE | phone_externalDomesticTransferUnmanaged | H_EDT_U |
| Phone | International | transactionActionCd = Approve | | phone_approvalExternalInternationalTransfer | H_AEIT |

According to some embodiments of the present disclosure, for example, a remote banking web channel:

| Channel | Transaction Type | Additional Fields | Calculated indicators | Base Activity | Base Activity Abr. |
|---|---|---|---|---|---|
| Web | SelfTransfer | | | web_selfTransfer | W_ST |
| Web | InternalTransfer | | isPayeeForegin Country = TRUE | web_internalInternationalTransfer | W_IIT |
| Web | InternalTransfer | | isPayeeForegin Country = FALSE | web_internalDomesticTransfer | W_IDT |
| Web | Domestic | | actimizeAnalytics CalculatedPayeeis Managed = TRUE | web_externalDomesticTransferManaged | W_EDT_M |
| Web | Domestic | | actimizeAnalytics CalculatedPayeeis Managed = FALSE | web_externalDomesticTransferUnmanaged | W_EDT_U |
| Web | International | transactionActionCd = Approve | | web_approvalExternalInternationalTransfer | W_AEIT |
| Web | International | transactionActionCd <> Approve | | web_nonApprovalExternalInternationalTransfer | W_EIT |
| Web | Ach | | | web_ACH | W_ACH |

According to some embodiments of the present disclosure, for example a remote banking offline channel:

| Channel | Transaction Type | Additional Fields | Calculated indicators | Base Activity | Base Activity Abr. |
|---|---|---|---|---|---|
| Offline | SelfTransfer | | | offline_selfTransfer | O_ST |
| Offline | InternalTransfer | | isPayeeForegin Country = TRUE | offline_internalInternationalTransfer | O_IIT |
| Offline | InternalTransfer | | isPayeeForegin Country = FALSE | offline_internalDomesticTransfer | O_IDT |
| Offline | Domestic | | actimizeAnalytics CalculatedPayeeis Managed = TRUE | offline_externalDomesticTransferManaged | O_EDT_M |
| Offline | Domestic | | actimizeAnalytics CalculatedPayeeis Managed = FALSE | offline_externalDomesticTransferUnmanaged | O_EDT_U |
| Offline | International | transactionActionCd = Approve | | offline_approvalExternalInternationalTransfer | O_AEIT |
| Offline | International | transactionActionCd <> Approve | | offline_nonApprovalExternalInternationalTransfer | O_EIT |
| Offline | Ach | | | offline_ACH | O_ACH |
| Offline | AddressBasedPayment | | actimizeAnalytics CalculatedPayeeis Managed = TRUE | offline_addressBasedTransferManaged | O_ABT_M |

According to some embodiments of the present disclosure, the implementation of the present disclosure does not impact on the architecture or the system 1200 itself. Nor does it affect the pre-detection and post detection stages of the system 1200.

According to some embodiments of the present disclosure, the data stream such as data stream 410 in FIG. 4 and data stream 580 in FIG. 5, may be comprised of incoming financial transactions into data integration component such as data integration 1210, which makes an initial preprocess of the data. The transaction enrichments component 1220 may perform transaction enrichments, which is the process of preprocess of the financial transactions. The historical data component 1230, which may receive data from application database 1270 or customers database 1260 may perform the process of getting historical data, synchronizes with new incoming financial transactions.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of ally flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus certain embodiments may be combinations of features of multiple embodiments. The foregoing description of the embodiments of the disclosure has been presented for the purposes of illustration and description. It is not intended to be exhaustive or to limit the disclosure to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the disclosure.

While certain features of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the disclosure.

What is claimed:

1. A computerized-method for real-time detection of real concept drift in predictive machine learning models, by processing high-speed streaming data, said computerized-method comprising:

in a computerized-system comprising a processor and a memory, receiving by the processor, a real-time data stream having labeled and unlabeled instances, every preconfigured period of time, performing by the processor:
(i) obtaining a window of 'n' instances from the data stream having a portion of the 'n' instances as reliable labels;
(ii) computing posterior distribution of the reliable labels of the portion of the 'n' instances; and
(iii) operating a Drift-Detection (DD) module, said DD module is configured to:
a. operating a kernel density estimation on the computed posterior distribution for sensitivity control of the DD module;
b. operating an error rate function on the estimated kernel density to yield an error value; and
c. training an incremental estimator module, according to the kernel density estimation;
when the error value is not above a preconfigured drift threshold repeat operations (i) through (iii),
else when the error value is above the preconfigured drift threshold, at least one real concept drift related action takes place.

2. The computerized-method of claim 1, wherein after obtaining a window of 'n' instances from the data stream, the processor is further configured to:
counting the labeled instances in the 'n' instances;
multiplying a cost by the counted labeled instances to yield a total-cost;
when the total-cost is, not above a preconfigured labeling budget:
operating a Knowledge Discovery (KD) module to obtain reliable labels of the portion of the 'n' instances by applying one or more machine learning models; and
performing operations (ii) through (iii).

3. The computerized-method of claim 2, before the performing of operations (ii) through (iii), further comprising:
initiating and training of a static estimator, according to the obtained reliable labels to provide the DD module a posterior distribution.

4. The computerized-method of claim 1, wherein the reliable labels of the portion of the 'n' instances are provided by an end-user before the obtaining of a window of 'n' instances from the data stream.

5. The computerized-method of claim 1, wherein when the error value is not above a predefined warning threshold, training the incremental estimator module with the obtained reliable labels of the portion of the 'n' instances.

6. The computerized-method of claim 1, wherein the error rate function is a Gauss error function.

7. The computerized-method of claim 1, wherein the posterior distribution is a sum of a prior distribution and a result of a likelihood function.

8. The computerized-method of claim 1, wherein the operating of the incremental estimator module comprises operating an incremental decision tree learner and training the incremental estimator module, according to the kernel density estimation.

9. The computerized-method of claim 8, wherein the incremental decision tree learner is an Hoeffding tree.

10. The computerized-method of claim 1, wherein the at least one real concept drift related action which takes place when the predictive machine learning models are operating in batch mode, is an alert to the predictive machine learning models to go offline and re-train for later deployment.

11. The computerized-method of claim 1, wherein the at least one real concept drift related action which takes place when the predictive machine learning models are operating online, is an alert to the predictive machine learning models to adjust to changing trend of statistics.

12. The computerized-method of claim 1, wherein the DD module receives a posterior distribution from the incremental estimator and the static estimator.

\* \* \* \* \*